United States Patent [19]

Williams

[11] Patent Number: 5,492,971
[45] Date of Patent: Feb. 20, 1996

[54] CURABLE ETHYLENE COPOLYMER BLEND COMPOSITION

[75] Inventor: Clive I. Williams, Hemel Hempstead, United Kingdom

[73] Assignee: E. I. Du Pont de Nemours and Company, Wilmington, Del.

[21] Appl. No.: 246,208

[22] Filed: May 19, 1994

[51] Int. Cl.⁶ .................. C08L 33/02; C08L 33/04; C08L 31/04; C08J 3/24
[52] U.S. Cl. .................. 525/194; 525/193; 525/195; 525/196; 525/198; 525/221; 524/522
[58] Field of Search .................. 525/196, 195, 525/221, 193, 194

[56] References Cited

U.S. PATENT DOCUMENTS

| 3,267,083 | 8/1966 | Imhof | 260/80.5 |
| 4,275,180 | 6/1981 | Clarke | 525/173 |
| 4,304,887 | 12/1981 | Cohen | 525/329 |
| 4,801,649 | 1/1989 | Statz | 525/221 |
| 5,214,108 | 5/1993 | Harrell | 525/387 |
| 5,274,035 | 12/1993 | Chundury | 525/221 |

FOREIGN PATENT DOCUMENTS

| 3506685 | 8/1986 | Germany. |
| 55-102641 | 8/1980 | Japan. |
| 58-217533 | 12/1983 | Japan. |
| 63-183359 | 7/1988 | Japan. |

*Primary Examiner*—Carman J. Seccuro, Jr.
*Attorney, Agent, or Firm*—Marilyn H. Bromels

[57] ABSTRACT

A curable ethylene copolymer blend composition is provided which is a blend of an ethylene dipolymer, an ionomer of an ethylene unsaturated acid copolymer, and a peroxide curing agent. The composition is particularly adapted for production of non-porous products under pressureless curing conditions.

9 Claims, No Drawings

CURABLE ETHYLENE COPOLYMER BLEND COMPOSITION

BACKGROUND OF THE INVENTION

This invention relates to curable ethylene copolymer compositions which are especially adapted for continuous pressureless curing processes.

Elastomeric compositions require a vulcanization, i.e. curing, step in order to develop the crosslinked network structure which confers rubbery properties to such compositions. Typically, the curing processes are based on compression molding, transfer molding, or injection molding techniques wherein a fully compounded elastomer composition is introduced into a mold which is then heated under pressure, thereby producing a cured product. Pressureless curing processes are also known and these methods generally involve extrusion of fully compounded polymer compositions at temperatures below that at which vulcanization occurs, followed by a second step wherein the extrudate is cured by exposure to conditions which promote formation of covalent crosslinks. For example, the extrudate might be passed through a hot liquid curing bath, a fluidized bed, or a continuous hot air tunnel. Such continuous processes, which are generally more economical than molding processes, are particularly suited for preparation of coated wire, sheet, and elastomeric profiles.

Pressureless cure processes are not suitable for all elastomer compositions, however. For example, many elastomeric ethylene copolymers having polar comonomer units display unacceptable sponging and porosity when cured by these techniques. Such effects are possibly due to inherently low polymer and compound viscosity, generation of volatiles during the curing process, and/or inadequate crosslinking during the early stages of the curing process.

Ethylene copolymers containing polar comonomers have unusually good heat and oil resistance. These properties are particularly desirable in compositions used in automotive applications, such as in vacuum hoses and radiator hoses wherein oil resistance is a critical property and in automotive wiring where heat resistance is important. Because continuous, pressureless cure processes are the most desirable manufacturing methods for producing extruded seals and coating wire, there is thus a need in the art for a composition which can withstand such processing conditions.

SUMMARY OF THE INVENTION

The present invention is directed to an ethylene copolymer blend composition particularly adapted for use in pressureless curing processes. Specifically, the invention is directed to a curable composition which comprises a blend of a) a dipolymer having copolymerized units of ethylene and a monomer selected from the group consisting of $C_1$–$C_8$ alkyl acrylates, $C_1$–$C_8$ alkyl methacrylates, and vinyl esters of $C_2$–$C_8$ carboxylic acids;

b) a copolymer comprising copolymerized units of i) ethylene, ii) a comonomer selected from the group consisting of $C_1$–$C_8$ alkyl acrylates, $C_1$–$C_8$ alkyl methacrylates, and vinyl esters of $C_2$–$C_8$ carboxylic acids, and iii) at least one 3–12 carbon atom carboxylic acid selected from the group consisting of alpha, beta-unsaturated monocarboxylic acids, alpha, beta-unsaturated dicarboxylic acids, and monoesters of alpha, beta-unsaturated dicarboxylic acids; wherein the carboxylic groups of the copolymer are neutralized with metal ions to a degree of at least 10%, and;

c) 0.5–6 parts per hundred parts combined component a) and component b) of an organic peroxide;

wherein the weight ratio of component a) to component b) is 99:1 to 70:30 and the blend is substantially free of foaming agents.

The invention is further directed to a pressureless cure process which comprises introducing the ethylene copolymer blend composition to an extruder or calender, extruding or calendering the composition under conditions such that no substantial crosslinking occurs, and heating the extruded or calendered composition to a temperature of between 100–300° C. under conditions wherein no external pressure is applied; thereby producing a non-porous, crosslinked copolymer blend composition.

DETAILED DESCRIPTION OF THE INVENTION

The curable compositions of the present invention are blends of ethylene dipolymers, metal ionomers of higher ethylene copolymers, and peroxide curing agents. The combination provides a composition which can be cured under pressureless conditions without development of sponging and porosity in the product.

The ethylene dipolymers are copolymers of ethylene and a $C_1$–$C_8$ alkyl acrylate, a $C_1$–$C_8$ alkyl methacrylate, or a vinyl ester of a $C_2$–$C_8$ carboxylic acid. The ethylene content of the dipolymers ranges from about 85–20 weight percent, preferably 65–30 weight percent. Representative examples of such compositions include copolymers of ethylene with methyl acrylate, methyl methacrylate, ethyl acrylate, ethyl methacrylate, n-butyl acrylate, 2-ethylhexyl methacrylate, n-butyl methacrylate, isobutyl acrylate, isobutyl methacrylate, 2-ethylhexyl acrylate, 2-ethylhexyl methacrylate, hexyl acrylate, hexyl methacrylate, and copolymers of ethylene with vinyl acetate, vinyl propionate, and vinyl hexanoate. Methyl acrylate, n-butyl acrylate, and vinyl acetate are preferred. The copolymers generally have Mooney viscosities ranging from 13–40 $ML_{(1+4)}100$; preferably 16–30, and most preferably 20–25. Blends of dipolymers may also be utilized.

The second component of the curable compositions of the present invention is a metal ionomer of a copolymer of ethylene, an unsaturated acid, and an unsaturated ester. More specifically, the compositions are ionomers of copolymers having copolymerized units of ethylene and carboxylic acids of 3–12 carbon atoms selected from the group consisting of alpha, beta-unsaturated monocarboxylic acids, alpha, beta-unsaturated dicarboxylic acids and monoesters of alpha, beta-unsaturated dicarboxylic acids. The polymers additionally contain copolymerized units of $C_1$–$C_8$ alkyl acrylates, $C_1$–$C_8$ alkyl methacrylates, or vinyl esters of $C_2$–$C_4$ carboxylic acids. The ethylene content of the copolymers ranges from about 25–70 weight percent of the polymer, preferably 35–65 weight percent, and the alpha, beta-unsaturated mono- or dicarboxylic acids are present in an amount sufficient to provide 0.1–10 weight percent, preferably 0.5–5.0 weight percent of carboxylic acid groups. Suitable alpha, beta-unsaturated mono- or dicarboxylic acids include those having 3–12 carbon atoms, for example, monocarboxylic acids such as acrylic acid and methacrylic acid; dicarboxylic acids, such as maleic acid, fumaric acid, and itaconic acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred. The alkyl acrylate or the vinyl ester comonomers comprise 25–70 weight percent of the polymer, preferably 30–65 weight pereel. Alkyl acrylates suitable for use in the polymers include $C_1$–$C_8$ alkyl esters of acrylic acid, for example, the methyl, ethyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2–8 carbon atoms, for example, vinyl acetate, vinyl propionate, vinyl hexanoate, and vinyl 2-ethylhexanoate. Vinyl acetate is preferred. Mooney viscosities, $ML_{(1+4)}100$, of these copolymers prior to ionomerization generally range from 1–50. Representative examples of such copolymers include ethylene/methyl acrylate/ethyl hydrogen maleate copolymers, ethylene/methyl acrylate/methacrylic acid copolymers, ethylene/acrylic acid/vinyl acetate copolymers, ethylene/butyl acrylate/acrylic acid copolymers, ethylene/vinyl acetate/methacrylic acid copolymers, ethylene/fumaric acid/methyl acrylate copolymers, ethylene/methyl acrylate/carbon monoxide/methacrylic acid and ethylene/ethyl hydrogen maleate/carbon monoxide/vinyl acetate copolymers. Copolymer blends may also be utilized.

The copolymers of the present invention are neutralized to a degree of at least 10% to form partial metal salts, that is, ionomers. The metal ions include univalent metal ions, such as lithium, sodium, potassium, and cesium; divalent metal ions, such as magnesium, calcium, strontium, barium, copper, and zinc; or trivalent metal ions, such as aluminum and iron. The alkaline earth metals are preferred, and calcium is the most preferred. The degree of neutralization will depend on the particular acid monomer being neutralized, its concentration in the polymer, and the viscosity properties of the resultant ionomer. For example, at low acid levels a high level of neutralization may be necessary, while, conversely, at high acid levels a low level of neutralization may be desirable. Generally, the amount of neutralization is such to provide a viscosity increase in the copolymer composition in the range of at least three times that of the non-ionomerized composition.

Both the dipolymers and copolymers are generally prepared by continuous copolymerization of ethylene and the comonomers in a stirred reactor in the presence of at least one free radical initiator at temperatures of from about 120° C. to 300° C. and at pressures of from about 130 to 310 MPa. Most preferably the copolymers are also prepared in the presence of about 2–25 weight percent methanol or acetone so that reactor fouling is decreased or eliminated.

The copolymer ionomers may be prepared by mixing the copolymers on a rubber mill, or in an internal mixer with a metal compound. This may be done in a precompounding step or the dipolymer, copolymer, suitable metal compound, and peroxide curing agent may be compounded together, thus producing an ionomer in the blend. A suitable metal compound is one which is capable of reaction with carboxylic acids to form carboxylates. Generally, about 1 to 50 parts of metal compound per 100 parts of the combined weight of dipolymer and copolymer is utilized, and preferably 2–5 parts are used. Metal oxides and hydroxides are preferred because they are highly reactive.

In a typical blend of the present invention the ratio of dipolymer to copolymer generally ranges from 99 parts dipolymer: 1 part copolymer to 70 parts dipolymer: 30 parts copolymer. Preferably the dipolymer: copolymer ratio is 80–90 parts dipolymer: 10–20 parts copolymer because processing properties and cured properties are balanced.

A peroxide curative is present in the curable compositions at a level of 0.5–6 parts per 100 parts combined dipolymer and copolymer ionomer. Preferably, 2–4 parts peroxide is used because at this level a good state of cure is obtained with minimum evolution of volatiles during processing. The peroxide curatives may be selected from the commonly used organic peroxy curing agents, such as dicumyl peroxide, t-butyl perbenzoate, benzoyl peroxide, t-butyl peracetate, 1,1-di(tbutylperoxy)3,3,5-trimethyl cyclohexane, 2,5-dimethyl-2,5-di(t-butylperoxy)hexyne, and n-butyl-4,4-bis(t-butylperoxy valerate). Use of a combination of more than one peroxide is advantageous in certain circumstances, although generally one peroxide is used alone.

A coagent may optionally be added to the curable composition to enhance the efficiency of the free radical generating agent. Such compounds include triallyl cyanurate, triallyl isocyanurate, diallyl maleate, high vinyl low molecular weight butadiene, N, N'-m-phenylene dimaleimide, pentaerythritol triacrylate, trimethylolpropane triacrylate, and trimethylolpropane trimethacrylate. Use of such coagents in free radical generation processes is well-established in the art. Generally, such compounds are added in amounts of from 1–4 pans per 100 parts combined dipolymer and copolymer.

The compositions may also include various additives commonly used in elastomer compounding, such as fillers, stabilizers, process aids, and plasticizers. Commonly used fillers include carbon black, silica, calcium carbonate, and blanc fixe. Fillers may be present in amounts of from 1–200 parts per 100 parts of the combined dipolymer and copolymer ionomer, generally in amounts of 20–80 parts. Silica is a particularly useful filler in amounts of 5–10 pans. Typical process aids include octadecylamine, stearic acid, and organic phosphate ester free acids. Preferred stabilizers are substituted diphenylamines. Commonly used plasticizers include polyester and poly(ether/ester) plasticizers, phthalate esters, and sebacate esters. The compositions are substantially free of foaming agents because an objective of the invention is the production of non-porous products.

The compositions of the present invention are particularly suited for pressureless cure processes because, when cured under such conditions, they do not produce a sponged or porous product. For example, the compositions may be cured as follows. A composition comprising the ethylene dipolymer, ethylene copolymer ionomer, and peroxide, in the proportions described above, in combination with any other suitable additives, and in the absence of a foaming agent, is introduced to a calender or extruder and formed into a sheet or extrudate under conditions which do not result in any substantial amount of crosslinking. This usually requires operation at temperatures of at least 70° C., preferably not exceeding 90° C., to prevent premature formation of crosslinks. The extrudate or sheet is then exposed to conditions which act to crosslink the compositions without the application of external pressure, for example by passing the compositions though a tunnel heated by hot air or microwaves, a hot liquid bath, or a fluidized bed. Alternatively, a noncontinuous process in a hot air oven may be employed. The time of exposure to any selected temperature range is dependent upon the heat transfer properties of the heating medium. For example, cure by means of hot air heating may require 10 minutes at 200° C., whereas cure in a liquid medium may require as little as 2 minutes. The cross-sectional thickness is also an important influence in both cases. A liquid medium is preferred because of its efficiency. Generally, exposure to temperatures within the range of 100–300° C., preferably 130–230° C., and most preferably from 150–200° C. is sufficient to result in complete cure. Preferably, the curing process is a continuous one, although the compositions may also be effectively cured in a non-continuous fashion.

The curable compositions of the present invention can be extruded or calendered into sheets. The resultant objects can be cured without development of unacceptable porosity under pressureless curing conditions. Thus, the compositions may be formed into wire covering, hose, belts, shaped profiles, cord, and tubing. The compositions are particularly useful in fabrication of extruded sections.

The present invention is illustrated below by the following preferred embodiments wherein all parts, proportions and percentages are by weight unless otherwise indicated.

EXAMPLES

Example 1

A copolymer of ethylene and methyl acrylate, containing 41 wt. % ethylene, was blended in a Banbury internal mixer at 90° C. with a copolymer of ethylene, methyl acrylate, and ethyl hydrogen maleate (monomer ratio 41:55:4), t-butylperoxy benzoate (Trigonox® C50D PD), calcium oxide, Naugard® 445 substituted diphenylamine, stearic acid, octadecylamine (Armeen® 18D), Struktol® WS 180 (a fatty acid silicone mixture), FEF carbon black, fumed colloidal silica (Cabosil® M7D), polycarbodiimide (Rhenogran® P50), and m-phenylene-bis-maleimide in the amounts shown in Table I. The resultant compound was extruded using an Iddon cold feed extruder using an Iddon HIM 50 mm screw having a length to diameter ratio of 15: 1. The temperatures of the screw, feed zone, zone 1, zone 2, the head, and the die were 80° C., 65° C., 65° C., 65° C., 80° C., and 85° C., respectively. The resultant extrudate was exposed to hot air curing for 10 minutes at 200° C., which resulted in cure of the composition. Physical properties of the cured extrudate, which exhibited no visible porosity, are shown in Table I.

TABLE I

| Component | Parts |
|---|---|
| Ethylene Methyl Acrylate Dipolymer | 87.5 |
| Ethylene Terpolymer | 12.5 |
| Calcium Oxide | 3 |
| Trigonox ® C50D PD | 6 |
| Naugard ® 445 | 1 |
| Stearic Acid | 2 |
| Armeen ® 18D | 0.5 |
| Struktol ® WS180 | 2 |
| FEF Carbon Black | 55 |
| Cabosil ® M7D | 5 |
| Rhenogran ® P50 | 3 |
| m-Phenylene Bis-Maleimide | 2.5 |
| Physical Properties | |
| Mooney Viscosity, ML 1 + 4 100° C. | 104 |
| Tensile Strength, $T_B$ (MPa) | 8.1 |
| Elongation at Break, $E_B$ (%) | 250 |
| Compression Set, 70 Hrs. @ 125° C. | 60 |
| Volume Swell, 70 Hrs./150° C./SG Oil, % | 13 |

I claim:
1. A curable composition which comprises a blend of
   a) a dipolymer having copolymerized units of ethylene and a monomer selected from the group consisting of $C_1$–$C_8$ alkyl acrylates and $C_1$–$C_8$ alkyl methacrylates, wherein the copolymerized ethylene units are present in an amount of from 20–85 weight percent;
   b) a copolymer comprising copolymerized units of i) 25–70 weight percent ethylene, ii) 25–70 weight percent of a comonomer selected from the group consisting of $C_1$–$C_8$ alkyl acrylates, $C_1$–$C_8$ alkyl methacrylates, and vinyl esters of $C_2$–$C_8$ carboxylic acids, and iii) at least one 3–12 carbon atom carboxylic acid selected from the group consisting of alpha, betaunsaturated monocarboxylic acids, alpha, beta-unsaturated dicarboxylic acids, and monoesters of alpha, beta-unsaturated dicarboxylic acids, wherein the carboxylic acid is present in an amount sufficient to provide 0.1–10 weight percent of carboxylic acid groups and the carboxylic groups of the copolymer are neutralized with metal ions to a degree of at least 10%; and
   c) 0.5–6 parts per hundred parts combined component a) and component b) of an organic peroxide; wherein the weight ratio of component a) to component b) is 99:1 to 70:30 and the blend is substantially free of foaming agents.

2. The composition of claim 1 wherein the organic peroxide is present in an amount of 2–4 parts per hundred parts combined component a) and component b).

3. The composition of claim 1 wherein the dipolymer contains copolymerized units of ethylene and a $C_1$–$C_8$ alkyl methacrylate.

4. The composition of claim 3 wherein the $C_1$–$C_8$ alkyl methacrylate is methyl methacrylate.

5. The composition of claim 1 wherein component b) is a copolymer of ethylene and a $C_1$–$C_8$ alkyl acrylate.

6. The composition of claim 5 wherein the copolymer is a copolymer of ethylene and methyl acrylate.

7. The composition of claim 6 wherein the copolymer is a copolymer of ethylene, methyl acrylate and a monoester of an alpha, beta-unsaturated dicarboxylic acid.

8. The composition of claim 1 which additionally contains a coagent.

9. A process for curing the composition of claim 1 which comprises introducing the composition to an extruder or calender, extruding or calendering the composition under conditions such that no substantial crosslinking occurs, and heating the extruded or calendered composition to a temperature of between 100–300° C. under conditions wherein no external pressure is applied, thereby producing a nonporous, crosslinked composition.

\* \* \* \* \*